Dec. 11, 1951  C. NICOLLE  2,578,445
PACKING MADE OF PLASTIC MATERIAL CHIEFLY
FOR PHARMACEUTICAL TUBES
Filed May 9, 1946  4 Sheets-Sheet 1
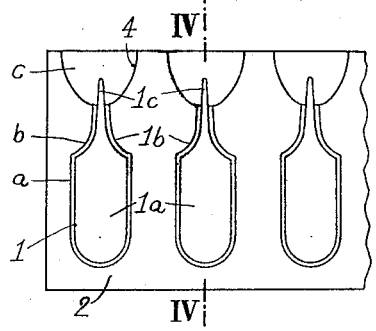
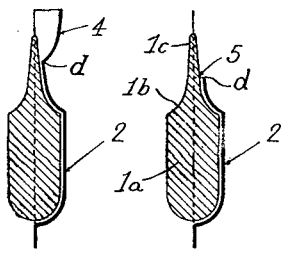
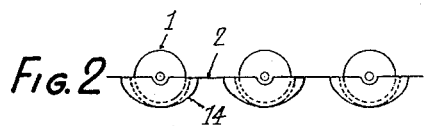
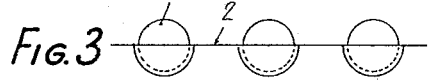
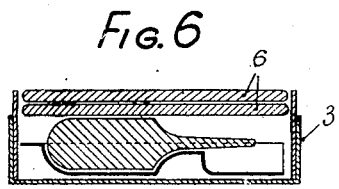
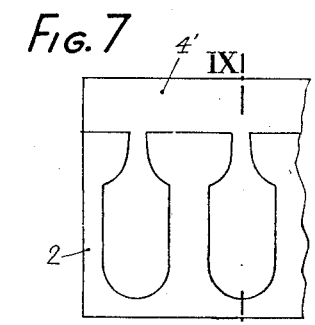
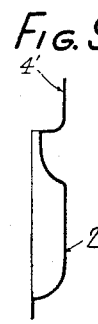
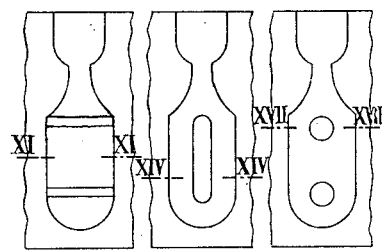
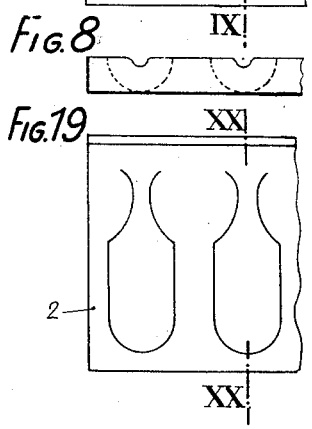
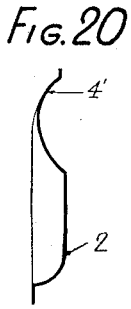
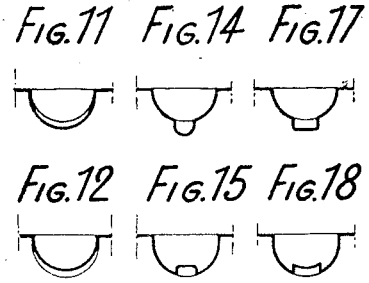
Inventor
Charles Nicolle
by his attorneys
Howson and Howson

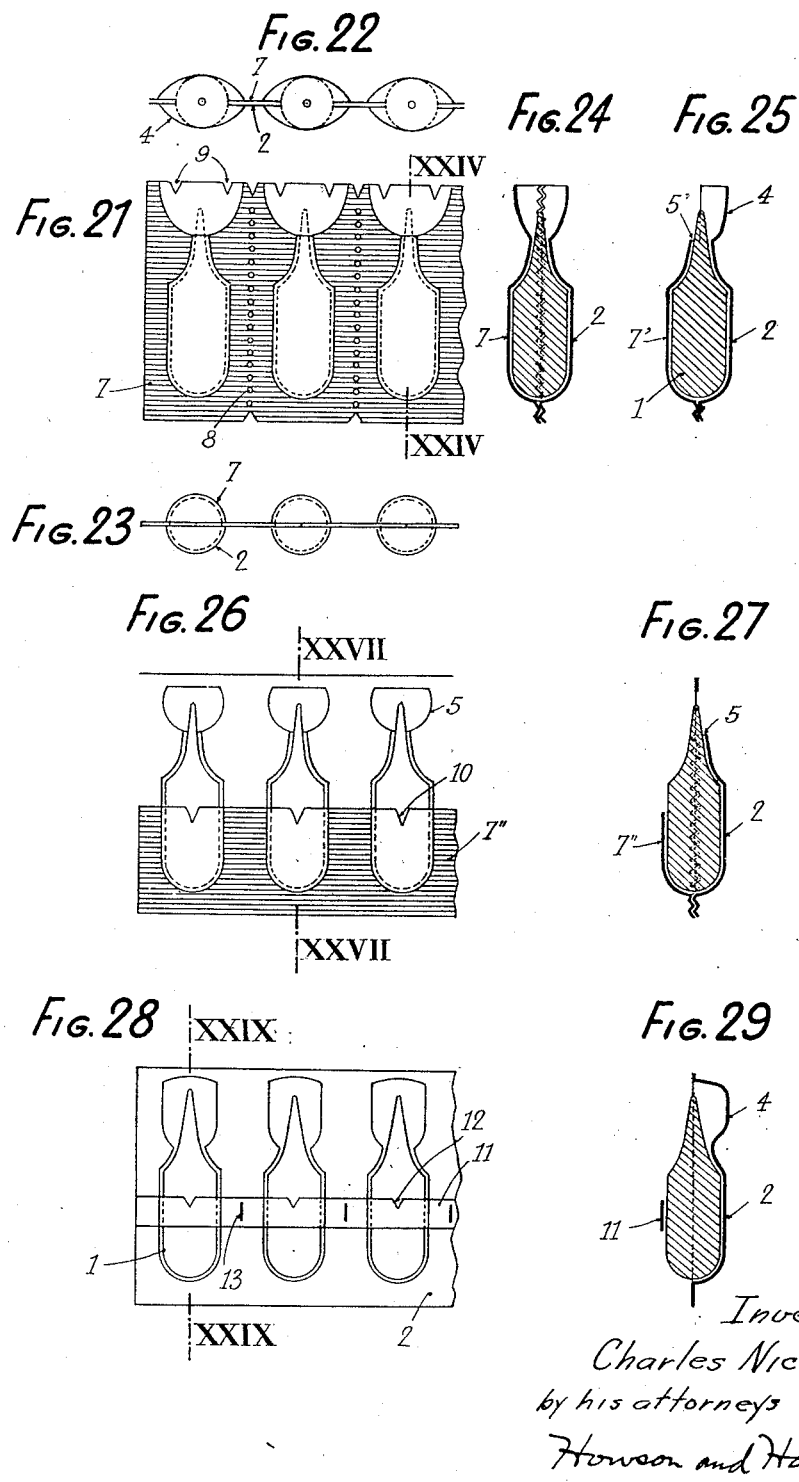

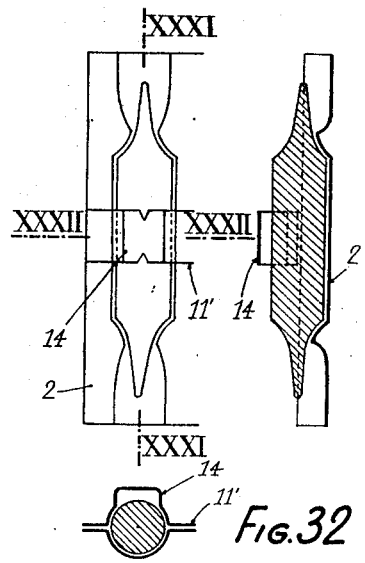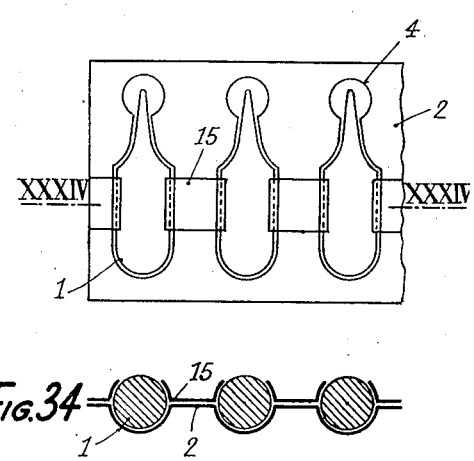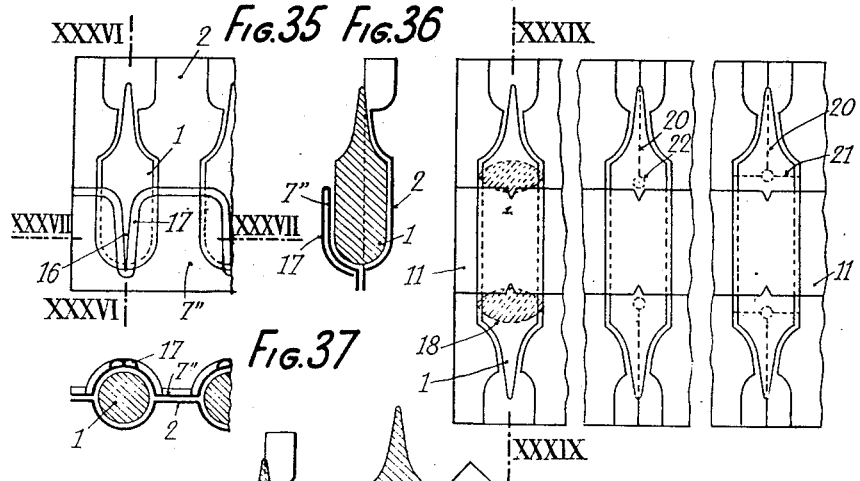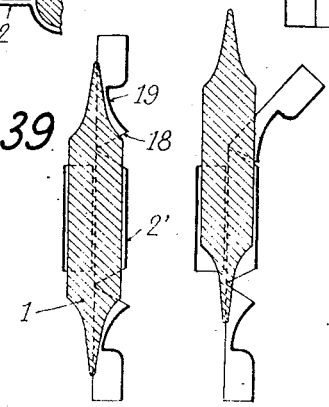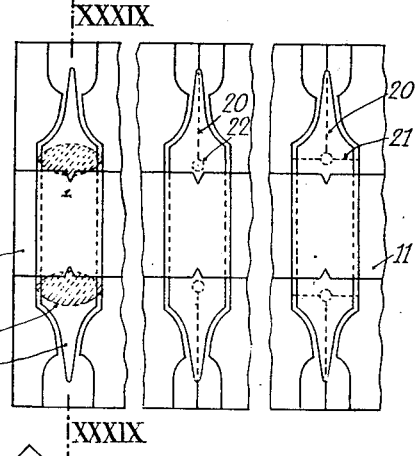

Dec. 11, 1951 C. NICOLLE 2,578,445
PACKING MADE OF PLASTIC MATERIAL CHIEFLY
FOR PHARMACEUTICAL TUBES
Filed May 9, 1946 4 Sheets-Sheet 4

Inventor
Charles Nicolle
by his attorneys
Howson and Howson

Patented Dec. 11, 1951

2,578,445

UNITED STATES PATENT OFFICE 2,578,445

PACKING MADE OF PLASTIC MATERIAL CHIEFLY FOR PHARMACEUTICAL TUBES

Charles Nicolle, Gentilly, France

Application May 9, 1946, Serial No. 668,561
In France February 19, 1945

Section 1, Public Law 690, August 8, 1946
Patent expires February 19, 1965

9 Claims. (Cl. 206—56)

This invention relates to packages or wrappings particularly suitable for ampoules and other containers of pharmaceutical or cosmetic preparations, these wrappings being so designed as to facilitate the withdrawal of the wrapped objects from their wrappings.

A wrapping according to the invention contains a tray which may be made of cellulose acetate or some other plastic material capable of being formed, by pressure or otherwise, with depressions adapted to snugly embrace part of the containers to be stored therein. It is the form of this tray and of these depressions which is intended in the first line to be protected in the present application and the patent granted thereon.

In the drawings affixed to this specification and forming part thereof, a number of embodiments of this invention are illustrated diagrammatically by way of example.

In the drawings:

Fig. 1 is a plan view of part of the tray with some of the depressions formed therein according to this invention.

Figs. 2 and 3 are opposite end views of the tray shown in Fig. 1 and of the tubular containers (ampoules) resting thereon.

Fig. 4 is a cross section on the line IV—IV in Fig. 1.

Fig. 5 is a similar view of a modified form.

Fig. 6 is a cross section of the entire package.

Fig. 7 is a plan view of a third embodiment of the tray,

Fig. 8 being a corresponding end view.

Fig. 9 is a section on the line IX—IX in Fig. 7.

Figs. 10, 13 and 16 are plan views and

Figs. 11, 14 and 17 are sections of three more tray forms while Figs. 12, 15 and 18 are cross sections of closely related variations of the three embodiments last mentioned.

Fig. 19 is a plan view, and

Fig. 20 a section on the line XX—XX of another embodiment.

Fig. 21 is a plan view and

Figs. 22 and 23 are opposite end views, while

Fig. 24 is a longitudinal section on the line XXIV—XXIV of still another embodiment.

Fig. 25 is a similar view of a further modification,

Fig. 26 is a plan view of another embodiment,

Fig. 27 being a longitudinal section on the line XXVII—XXVII.

Fig. 28 is a plan view of another modification,

Fig. 29 being a cross section on the line XXIX—XXIX.

Fig. 30 is a plan view of a further embodiment,

Figs. 31 and 32 being a longitudinal and a cross section on the lines XXXI—XXXI and XXXII—XXXII, respectively.

Fig. 33 is a plan view of still another embodiment, while Fig. 34 is a cross-section on the line XXXIV—XXXIV.

Fig. 35 illustrates a further modification, while

Figs. 36 and 37 are cross-sections on the lines XXXVI—XXXVI and XXXVII—XXXVII, respectively.

Fig. 38 shows still another embodiment,

Figs. 39 and 40 being longitudinal sections on the line XXXIX—XXXIX.

Figs. 41 and 42 illustrate two more forms while

Figure 43:
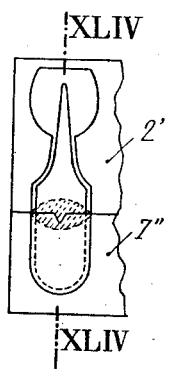

Fig. 43 is another modification, with

Figure 44:
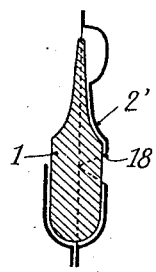
Figure 45:
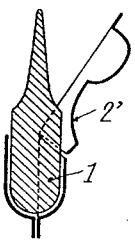

Figs. 44 and 45 showing the same in longitudinal section on the line XLIV—XLIV in different positions.

Figure 46:
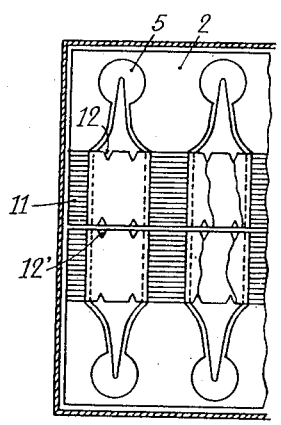

Fig. 46 is a plan view of a modified form, and

Figure 47:
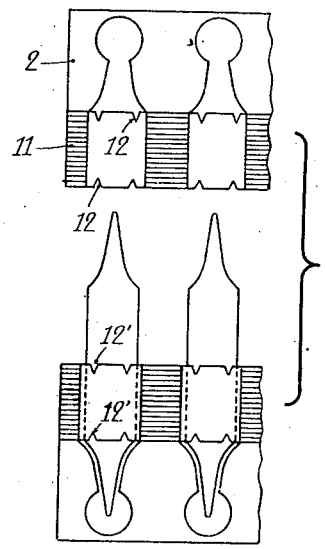

Fig. 47 is a view of the two parts of the package before assembly.

Figure 48:
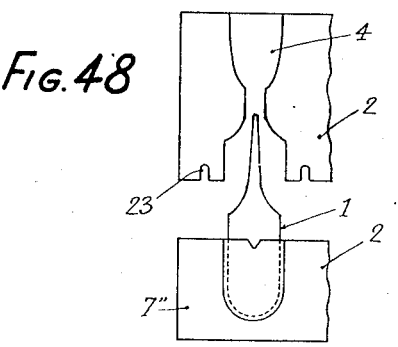

Fig. 48 is a similar view of a modification.

Referring to the drawings and first to Figs. 1–4, $1$ is one of the containers to be wrapped and the others of the depressions in the sheet or strip $2$ of plastic material which constitutes the tray. As a rule, this tray will be placed in a box (such as $3$ in Fig. 6) and the depressions formed in it according to the invention are shaped to facilitate the ready withdrawal of individual ampoules from the open box without the necessity of first withdrawing the entire tray and the other ampoules supported thereon.

The ampoules here shown have a tubular body $1a$ and a tapering neck section $1b$ ending in an almost cylindrical tip $1c$. The depressions in the tray are so formed as to snugly embrace, as shown at $a$, the lower part, for instance, the lower half of the tubular container bodies $1a$ and also, as shown at $b$, of the tapering neck section $1b$ but not the tips $1c$ of the container necks. Since these tips are spaced radially from the bottom of the depression $a$ by the radius of the tubular body $1a$, it is easy to lift the ampoule by inserting a finger tip or nail under the ampoule tip $1c$, lift it and grip the neck $1b$ or the body $1a$ with two fingers. Alternately, by pressing down the ampoule tip $1c$, the ampoule can be tilted about the edge $d$ formed in the tray whereby the ampoule body is lifted free of its support and can easily be gripped.

In order to so move the ampoule, the tray either ends some distance, for instance half an inch, short of the ampoule neck tip, as shown in Fig. 5, or, according to Figs. 1, 4 and 6, flares widely around the tips, the flaring section $c$ having, for instance, the same radius as the body supporting section $a$.

The clearance provided for the tips of the tubes instead of being individual and provided in each tube-containing recess as disclosed as shown in Fig. 5, may form a clearance $4'$ common to all the recesses as illustrated in Figs. 7 to 9.

Moreover, if it is desired, this common clearance 4' common to all the recesses may assume a shape different from that illustrated in Figs. 7 to 9, for instance a shape such as that illustrated in Figs. 19 and 20.

To provide for the fitting of the tray inside the box 3 it is sufficient for instance to place over the row of tubes a cushion 6 of suitable material as shown in Fig. 6. This cushion may for instance be formed by a folded pamphlet of printed matter relating to the contents of the tube.

This method of holding the tube may however be unsatisfactory or appear insufficient and consequently it may be preferable to associate the tray 3 with more reliable retaining means selected from the arrangements disclosed hereinafter by way of examples.

However the simplified form described hereinabove (Figs. 1 to 6) may be used whenever it is desired to obtain a simple and very cheap packing arrangement.

In order to hold securely the tubes, I may resort, as illustrated in Figs. 21 to 27, to a second plate 7 similar to the tray 2 (see in particular Fig. 2); preferably after having placed the tubes inside their recesses, the plate 7 and the tray are connected at their flat sections through the agency of any suitable means such as heat, glue or a solvent or through any suitable stapling means.

In the example illustrated in Figs. 21 to 24, the lower and upper plates 2 and 7 are illustrated with the striations formed fixing the parts to each other at their flat portions. These striations are of course optional and so are the perforations 8 located between the recesses, said perforations being adapted to be used eventually for furthering the separation of the packed tubes one with reference to the other.

In Fig. 21, I have shown at 9 notches for initiating tears whereby a slight upward pull on the packing may tear open the upper plate 7 and thus release the tube.

The two plates 2 and 7 may be absolutely symmetrical and both include means for facilitating tearing as shown at 9; in other words, the plate 7 may form as well the tray and the plate 2 form the cover and reversely.

In the case of Fig. 25, the retaining plate 7' does not completely duplicate the carrier plate 2. This plate 7', instead of showing a recessed clearance 4 similar to that in the carrier plate 2 shows a cut out clearance 5' similar to the clearance 5 in the carrier plate 2 of the form of execution illustrated in Fig. 5.

For the removal of the tube 1 it is sufficient to take hold of the tip of said tube and to draw it outwardly or towards the operator. With a view to making easier the tearing of the recess, a means for facilitating tearing is provided at 5'.

If desired, it is also possible to use for holding the tubes in place the arrangement illustrated in Figs. 26 and 27 which is a modification of the arrangement of Figs. 21 to 25. In Fig. 26 the body of the tube is tightly fitted inside a recess matching it as to size as precedingly. The carrier plate 2 is identical with the carrier plate disclosed hereinabove. In the example now being discussed, this plate 2 is similar to the plate provided with cut-out clearances 5 in Fig. 5 while the upper plate 7" is reduced to the portion corresponding to the body or to a portion of the body of the tube.

The omission of a portion of the recessed plate 7" makes it still easier to remove the tube. A slight lifting of the tip of the tube causes an initiation of a tear through the means 10 provided therefor on said plate so that the tube is very easily set free.

In Figs. 28 and 29 I have shown a further form of execution of the invention wherein the tube retaining and holding means are constituted by means of a strip 11 of suitable breadth which carries preferably tear initiating means 12.

The strip 11 may mate exactly as to outline the shape of the tubes and include flat portions which are exactly applicable over the flat portions of the recessed plate or carrier 2 which latter is provided as precedingly with a clearance 4 towards the tip of the tube. Said strip may also form a mere band stretched over the tubes 1 and secured to the flat portions of the carrier plate 2 merely through staples 13 as shown in Fig. 28.

In the different abovementioned arrangements illustrated in Figs. 21 to 29 it is easy to see that it is necessary to first locate the tubes in the recessed carrier plate 2 after which the other plate 7, 7' or 7" or the retaining strip 11 is secured over the whole. This being done, and only then, the upper member 7, 7', 7" or 11 is secured to the lower plate 2, which requires handling on a machine after loading, and leads to a comparatively delicate operation by reason of the brittleness of the tubes.

To remove these difficulties and in the absence of any further drawbacks, it is possible to make use of one of the following arrangements, as disclosed hereinafter.

In a further simplified form of execution as illustrated in Figs. 30 to 32 the retaining strip 11' considered may show an outline provided with an outstanding portion 14 as shown more particularly in Figs. 31 and 32 whereby the assembling of the carrier plate 2 with the retaining strip 11' may be executed before the positioning of the tubes so that the latter may be thus easily introduced into their recesses, which may be obtained by forcing them slightly as allowed by the yieldingness of the strip 11'.

This being done, the strips act after the manner of a spring for locking the tube inside its recess. For removing it subsequently, it is sufficient to draw one of the tips upwardly without it being necessary to remove the plate 2 from the card-board box containing it as the tear initiating means act then and break the upper strip so as to release the tube.

In a further form of execution illustrated in Figs. 33 and 34, I use a discontinuous strip 15, the separate elements of which act after the manner of a spring.

This discontinuous strip 15 is secured to the carrier plate 2 provided as precedingly with clearances 4 in front of the tip of the tubes, before loading the packing with the tubes. By reason of the yieldingness of the material used, it is possible by slightly forcing them down, to introduce the tubes 1 by hand into their recesses. The separate elements of the discontinuous strip 15 act then after the manner of a spring for securely holding the tube 1 in place.

Similarly it is easy to remove the tubes 1 out of their recesses without breaking the packing by reason again of the yieldingness of the plastic material used.

Of course, and more particularly in this case the thickness of the plastic material used for the discontinuous strip 15 should be sufficient for retaining the tubes.

In the form of execution illustrated in Figs.

35 to 37, there is used a cradle or plate 2 similar to the preceding plates and associated with an upper plate 7″ of reduced width as in the case of Fig. 26; but in this case the plate 7″ is slotted at 16 down to the bottom of the recesses preferably so that the tubes 1 may be in introduced into their recesses after the upper plates 7″ have been secured to the carrier plate 2 through any suitable means such as glue, solvent, heat, stapling or the like. In this case, it is of advantage to form as shown in Figs. 35 to 37 a rib 17 along the edges of the upper plates 7″ at least in their free portion.

The material being yielding, it is possible by means of a slight effort to engage the tube into its recess without it being capable of moving out of it fortuitously as its weight is clearly insufficient in comparison of the resistance of the material, said resistance being due in particular to the incurved shape of the upper recess.

On the contrary as soon as it is desired to remove the tubes, it is sufficient to draw the tip upwardly, the upper recess opens then in register with the slot 16 and it eventually tears and allows in all cases the removal of the tubes.

In Figs. 38 to 45, I have shown another form of execution of the invention allowing also the introduction of tubes after the complete formation of the packing.

In the case of Figs. 38 to 40, there is provided in the lower carrier plate 2′ an opening 18 or two openings if, as illustrated, the packing is intended for tubes provided with two tips and if it is desired to obtain a perfectly symmetrical packing operating in both directions; this opening or these openings appear in plan view for instance under the form illustrated by the dotted outline of Fig. 38. These openings are provided between the shoulder 19 holding the tapering portion of the tube and the cylindrical portion covered by the upper strip 11 holding the tube in place.

When it is desired to introduce a tube inside the recess, it is sufficient to make the end of the supporting plate 2′ rock as shown in Fig. 40, the flat part of the plate forming a sort of hinge for uncovering the cylindrical recess which is to receive the tube.

If the packing is located vertically during the operation as in the case of Figs. 39 and 40 the tube assumes automatically its proper location.

Moreover in practice it is sufficient to engage the tube without exerting any rough action and the plate will bend automatically so that the tube enters the desired position. At this moment by reason of the yieldingness of the material, the displaced end of the carrier plate 2′ returns into its normal position and when the packing with its tube has been laid flat in its card-board box intended for receiving it, the plate behaves exactly as if there were no opening 18 in the lower plate of the carrier 2′.

With the form illustrated in Fig. 41, I obtain a result similar to the preceding case by using longitudinal slots of suitable length 20 illustrated in dotted lines.

In Fig. 42, I have associated longitudinal slots 20 with transversal slots 21. In both bases it is of interest to make the slots considered end in a small opening 22 for preventing any tear that might be produced, if such stopping means did not exist, when the tubes are being introduced.

Other systems for securing the plates together and other slot arrangements may be used to a similar purpose.

In Figs. 43 to 45 I have shown an arrangement similar to the preceding arrangement but intended for a single tip tube wherein the retaining strip 11 is replaced in the packing of one tip tube by an upper retaining plate of reduced width 7″ similar to that shown in Figs. 26 and 27 for instance. But as in the case of Figs. 38 and 39 the supporting plate 2′ is provided with an opening 18 allowing the end of the plate 2′ to bend at the moment of introducing the tube 1 as shown in Fig. 45.

In the form of my invention illustrated in Figs. 46 and 47 the packing is constituted by a carrier plate 2 with cut out clearances 5 for the tips of the tube, said carrier plate being associated with a retaining strip 11. This packing is somewhat similar to that of Fig. 38 but in this case it includes no opening 18; instead of this it is cut longitudinally, this being performed preferably through a line midway of the width of the packing so that the two halves are substantially symmetrical.

The two parts of the packing thus provided are entirely formed before the positioning of the tubes. This positioning becomes very simple with the arrangement disclosed. The tubes are located inside one of the parts of the packing, after which they are capped by the other part and the whole is laid inside the card-board box executed to the exact size of its contents.

For removing a tube, it is sufficient to draw it upwardly or towards the operator through one of its tips; the upper strip of the first part of the packing is torn thereby and then the means for initiating a tear in the upper strip of the second portion becomes operative and the tube is released.

It is of advantage to provide a plurality of notches for initiating tears at 12 and 12′ for each of the parts of the packing so that the strips 11 may be severed with a greater facility as illustrated in Fig. 46 for the right hand tube.

In the form of execution illustrated in Fig. 48 the packing comprises a supporting plate 2 with clearances 4 and an upper plate of reduced size 7″ similar to that illustrated in Fig. 26. In the case of Fig. 48 only the cradle plate 2 is cut longitudinally. As in the preceding case it is therefore easy to engage the tubes inside the recesses formed by two half shells or plates. The second portion of the packing formed by the other end of the carrier plate 2 is fitted over the tubes carried in the first part considered by securing it to the first part of said carrier plate through any suitable means. I may to this purpose make use of slots 23 adapted to fit to either side of the flat parts of said second part of the plate 2. If desired it is possible to weld them by merely touching them with a brush laden with a suitable solvent such as acetone or with glue or in fact it is possible to merely lay the system inside the box adapted to hold them and which is given a corresponding size.

In the above disclosed form of execution, it is possible to associate with the different features of the above disclosed invention ribs or projections for the inner or outer protection against shocks. This has been illustrated by a few examples in Figures 10 to 18. Of course these ribs or projections may receive any other shape or arrangement other than that disclosed.

Of course all the above described examples of execution provided for one tip tubes may be used with corresponding modifications for two tip tubes and reversely. It should be noticed moreover that my invention is applicable not only to the packing of pharmaceutical and the like tubes, but also the packing of any similar objects provided with tips or tapering parts.

In all the above described forms of execution and more particularly in the forms of execution of Figures 30 to 32, 33 and 34, 35 to 37, 38 to 42, 43 to 45, it is of advantage to use as a plastic material for forming the packing acetate of cellulose or the like equivalent plastic material; the reason is that it is only with a thin and yielding material capable of bending and reassuming exactly and permanently its shape without any modification that most of the above disclosed solutions are practically possible. It is also because this material, in spite of its strength, tears with a great facility when a tear has begun that most of the above disclosed forms of execution are capable of operation.

It should be noticed lastly that in the case of all the packings executed in accordance with my invention, the thickness of the plastic material used for the carrier plate 2 and for the retaining means 7 or 11 may vary according to the weight, length and shape of the tubes to be protected. In a same packing moreover, two thicknesses are generally commendable: for the upper plates or strips adapted to be torn a small thickness is preferably used, whereas a somewhat greater thickness, remaining always inconsiderable, is preferably given to the lower or cradle plates.

Of course all the above described arrangements illustrated in the drawings have been disclosed solely by way of examples and numerous modifications may be brought to their detailed execution without the general economy of the invention being altered thereby. Thus in particular, the shape of the recesses may vary in accordance with the objects to be packed. Thus also the shape of the clearances 4 or 5 may also be different from the shape illustrated. Furthermore the notches provided for initiating tears at 10 or 12 may be of any type other than that disclosed in accompanying drawing. Lastly the flat portions of the packings may carry striations of a type differing from that illustrated in the above examples of execution and they may in fact be arranged differently or eventually carry indications such as marks, indications for use and the like. It should be mentioned finally that the upper strips or plates are preferably transparent so as to allow the tubes, the colour of the product therein, its name, and the like to be seen. These upper strips or plates may also carry impressions of any kind.

What I claim is:

1. A packing for ampoules and similar elongated containers having tubular body portions and tapered neck portions connecting said body portions to relatively slender, substantially cylindrical tip portions, comprising a tray formed with elongated depressions for receiving one longitudinal half of each of said containers, with the other longitudinal half of each container projecting above said tray, each said depression being shaped to engage the container snugly substantially throughout the surfaces of one longitudinal half of said neck portion and of said body portion, while leaving most of the tip portion free of such engagement, so as to hold said container firmly against lateral and endwise movements while permitting free access to said tip portion so that it may be used as a lever to lift the container out of the depression, said tray being provided with weakened portions adjacent the ends of the depressions, so that the portions of the tray conforming to the container neck portions may be flexed downwardly out of alignment with the depressions to permit the insertion of containers in said depressions or their withdrawal therefrom by movement of the containers lengthwise of the depressions.

2. A packing as defined in claim 1, wherein said weakened portions comprise notches formed in the walls of the depressions adjacent the points where the depressions are tapered to conform to the tapered necks of the containers.

3. A packing as defined in claim 1, wherein said weakened portions comprise, for each depression, a first slot extending from the edge of said tray longitudinally of said depression, and a second slot extending transversely of said depression and intersecting the inner end of the first slot.

4. A packing for containers as defined in claim 1, in which each said weakened portion of the tray has an aperture extending substantially the full width of its associated depression, said aperture being wider at the center of the depression than at the sides thereof.

5. A packing for containers as defined in claim 1, including an upper retaining member extending transversely across said depressions and attached to said tray member between said depressions, said retaining member extending over a portion only of each said depression, said portions being substantially less than the full length of said depressions.

6. A packing for containers as defined in claim 1, in which each container has a neck portion and a tip portion at one end only, and the tray is provided with weakened portions adjacent the corresponding end only of each depression.

7. A packing for containers as defined in claim 1, in which each container has neck portions and tip portions at both ends, and the tray is provided with weakened portions adjacent both ends of each depression.

8. A packing as defined in claim 1, wherein said weakened portions comprise, for each depression, a slot extending from the edge of said tray longitudinally of said depression.

9. A packing as defined in claim 8, wherein said slots terminate in circular apertures.

CHARLES NICOLLE.

REFERENCES CITED

The following references are of record in the file of this patent:

UNITED STATES PATENTS

| Number | Name | Date |
|---|---|---|
| 1,960,279 | Read | May 29, 1934 |
| 2,020,454 | Bisbee et al. | Nov. 12, 1935 |

FOREIGN PATENTS

| Number | Country | Date |
|---|---|---|
| 296,912 | Italy | May 30, 1932 |
| 463,844 | Great Britain | Apr. 7, 1937 |
| 840,328 | France | Jan. 16, 1939 |

OTHER REFERENCES

Alien Property Custodian Publication Serial No. 206,498, May 18, 1943.